US008267007B2

(12) United States Patent
Tatera

(10) Patent No.: US 8,267,007 B2
(45) Date of Patent: Sep. 18, 2012

(54) CARBONATION DEVICE

(76) Inventor: Patrick J. Tatera, Talkeetna, AK (US)

( * ) Notice: Subject to any disclaimer, the term of this patent is extended or adjusted under 35 U.S.C. 154(b) by 448 days.

(21) Appl. No.: 12/591,407

(22) Filed: Nov. 18, 2009

(65) Prior Publication Data

US 2011/0113972 A1 May 19, 2011

(51) Int. Cl.
*A23L 2/00* (2006.01)
*B01F 3/00* (2006.01)

(52) U.S. Cl. .................. 99/323.2; 99/323.1; 261/DIG. 7

(58) Field of Classification Search ................. 99/323.2, 99/323.1, 275; 261/DIG. 7, 65, 121.1
See application file for complete search history.

(56) References Cited

U.S. PATENT DOCUMENTS

| | | | | |
|---|---|---|---|---|
| 437,318 | A | 9/1890 | Thackeray | |
| 2,073,273 | A * | 3/1937 | Wetstein | 99/323.2 |
| 2,600,901 | A | 6/1952 | Meldau | |
| 4,316,409 | A | 2/1982 | Adams et al. | |
| 4,458,584 | A | 7/1984 | Annese et al. | |
| 4,475,448 | A * | 10/1984 | Shoaf et al. | 99/323.1 |
| 4,482,509 | A | 11/1984 | Iannelli | |
| 4,679,602 | A | 7/1987 | Hollis et al. | |
| 5,182,084 | A | 1/1993 | Plester | |
| 5,460,846 | A | 10/1995 | Stumphauzer et al. | |
| 5,549,037 | A * | 8/1996 | Stumphauzer et al. | 99/323.1 |
| 5,725,896 | A * | 3/1998 | Banks | 426/112 |
| 5,836,364 | A | 11/1998 | Burton | |

FOREIGN PATENT DOCUMENTS

| | | |
|---|---|---|
| GB | 2137894 | 10/1984 |

* cited by examiner

*Primary Examiner* — Reginald L Alexander
(74) *Attorney, Agent, or Firm* — Richard C. Litman

(57) ABSTRACT

The carbonation device includes a cap system selectively mounted to the mouth of a liquid container. The cap system includes a cap, a rotatable control ring coaxial with and selectively attached to the cap, a reaction vessel selectively attached to the bottom of the cap, and an elongate distribution tube selectively mounted to the cap. The reaction vessel is filled with a preselected amount of carbonating material such that when the control ring is rotated in one position, water may be introduced into the vessel to initiate the carbonation reaction. In another position, the carbonating gas flows into the liquid via the distribution tube. Other rotated positions permit locking and unlocking of the control ring. The carbonation device also includes a drop-in configuration that serves as a self-contained carbonation distribution vessel.

17 Claims, 14 Drawing Sheets

CARBONATION DEVICE

BACKGROUND OF THE INVENTION

1. Field of the Invention

The present invention relates to beverage enhancers, and more specifically to carbonation device for carbonating beverages, particularly home-brew beer, in a relatively short amount of time.

2. Description of the Related Art

One of the basic necessities to any outdoor activity is potable liquid. It is basic to survival and allows the outdoorsman, e.g. backpackers, hunters, hikers and campers, to keep the body hydrated during the physical activity. If the outdoorsman desires carbonated beverages, the outdoorsman is relegated to toting around bottles or cans of pre-carbonated beverages that may add considerable weight and bulk to his or her pack. Majority of the weight and volume is attributed to the water component in the beverages.

A solution for the drawbacks of the above would be to carry a beverage concentrate to which a user may add purified water for a refreshing drink. However, this solution still lacks the effervescent sensation provided by carbonation that many people enjoy.

Another solution involves the use of a complicated cap system for a bottle or container comprising a plurality of mechanical parts and piping for pressurizing and distributing carbonating gas into the liquid. However, this type of system is costly and difficult to clean, mainly due to the complexity and number of parts for the device.

A further solution involves the use of a carbonation tablet that may be dropped into a liquid container to produce the effervescence. This is a quick and easy way to carbonate the liquid, but the resultant product oftentimes includes an aftertaste that may overpower the taste of the potable liquid. Moreover, the chemical reaction may include some unpalatable solid byproducts. Thus, it would be a benefit in the art to provide an efficient and economical device for carbonating potable liquids with minimal adverse effects on the palate.

Thus, a carbonation device solving the aforementioned problems is desired.

SUMMARY OF THE INVENTION

The carbonation device includes a cap system selectively mounted to the mouth of a liquid container. The cap system includes a cap, a rotatable control ring coaxial with and selectively attached to the cap, a reaction vessel selectively attached to the bottom of the cap, and an elongate distribution tube selectively mounted to the cap. The reaction vessel is filled with a preselected amount of reactants so that when the control ring is rotated in one position, water may be introduced into the vessel to initiate the carbonation reaction. In another position, the carbonating gas flows into the liquid via the distribution tube. Other rotated positions permit locking and unlocking of the ring. The carbonation device also includes a drop-in configuration that serves as a self-contained carbonation distribution vessel.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
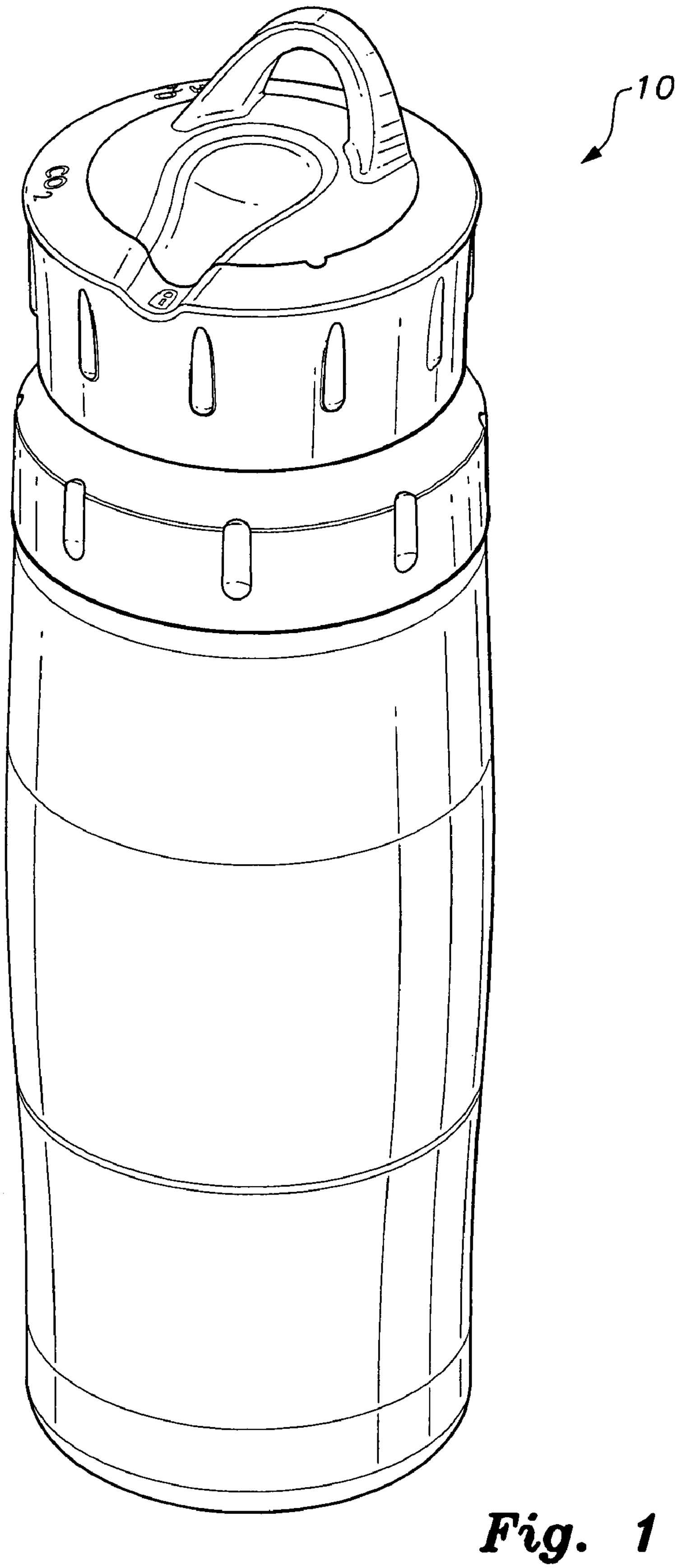
FIG. 1 is a perspective view of a first embodiment of a carbonation device according to the present invention.
Figure 2:
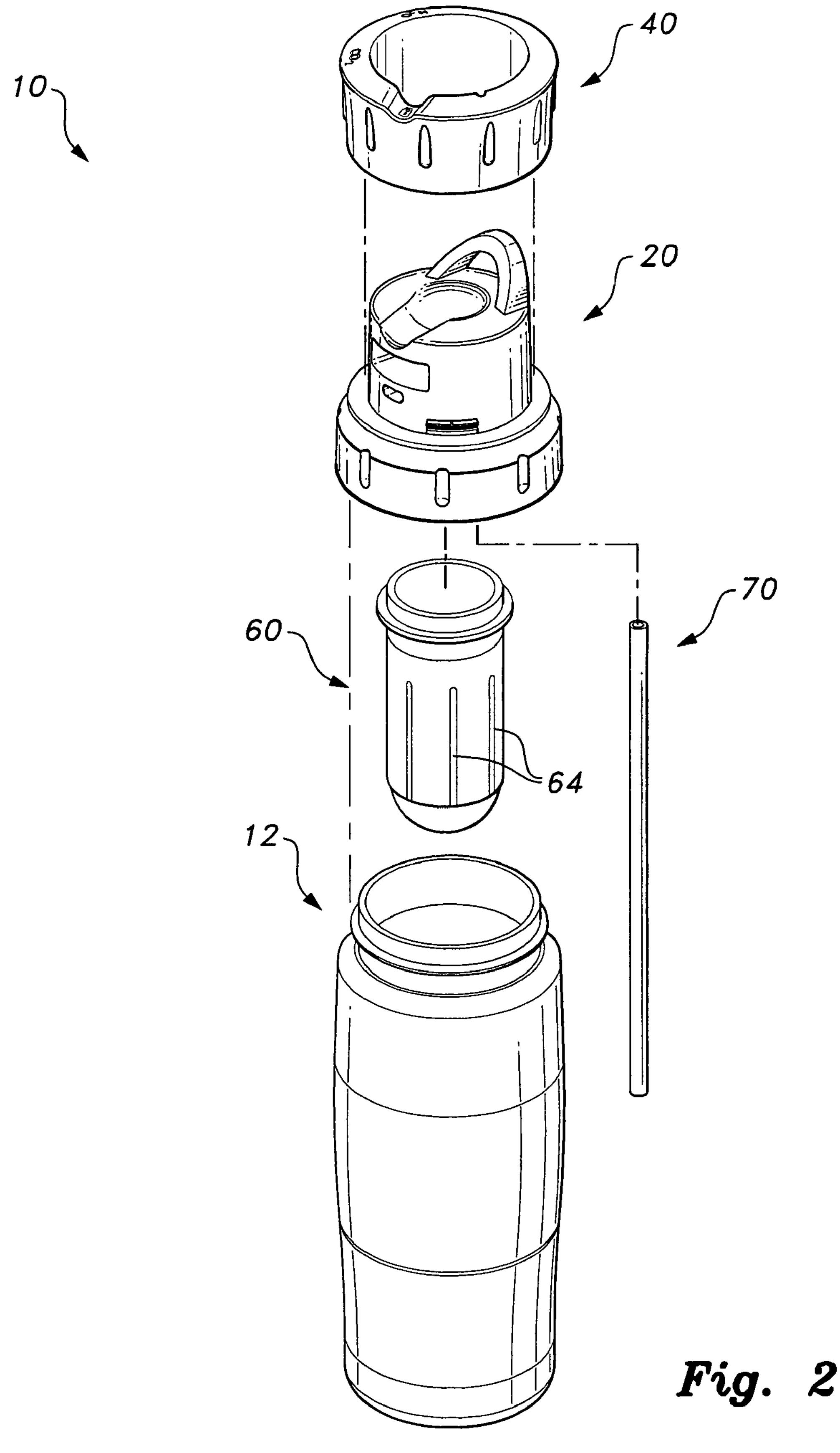
FIG. 2 is an exploded view of the carbonation device according to the present invention.

The present invention relates to a carbonation device, a first embodiment of which is generally referred to by reference number 10 in the drawings, for producing carbonated beverages on demand in an efficient manner. As shown in FIGS. 1 and 2, the carbonation device 10 includes a cap 20, which is adapted to be selectively mounted to a conventional liquid container or water bottle 12; a control ring, valve or manifold 40 coaxially mounted and rotatable with respect to the cap 20; a reaction chamber, container or vessel 60 detachably mounted to the bottom of the cap 20; and a carbonating gas distribution tube or straw 70 detachably mounted to the bottom of the cap 20 adjacent the reaction vessel 60. The carbonation device 10 utilizes an endothermic reaction to produce carbonating gas, i.e. $CO_2$, within the reaction vessel 60. The gas feeds into the liquid via the distribution tube 70 to be absorbed by the liquid resulting in a carbonated beverage. Various ports and vents in the cap 20 and the control ring 40 align with each other at preselected rotated positions of the control ring 40 for each stage of the carbonation process, the details of which will be further discussed below. Due to the above, the bottle or container 12 is made of durable and relatively high strength materials to handle the pressures of carbonation.

Turing to FIGS. 1-3C, the cap 20 includes a tiered or telescoped cylindrical body having an upper, first body portion 26 and a lower, second body portion 22. The first body portion 26 has a smaller diameter than the second body portion 22. The larger diameter second body portion 22 forms a ledge upon which the control ring 40 may be mounted and rotate. The outer edge of the second body portion 22 may also include indentions, protrusions or other grip enhancing features. The second body portion 22 forms a substantially annular ring with interior threads 24 for mounting the cap 20 onto the neck of the bottle 12 via corresponding threads 14.

Starting from the top, the first body portion 26 includes an attachment loop or carabiner stem 31, which serves as a means of carrying the carbonation device 10 either by finger or an attachment clip. A centrally disposed water trough or inlet groove 30 is formed on the top of the cap 20 through which water may be introduced into the interior of the cap 20 for the carbonation process. The trough 30 may be a keyhole- or teardrop-shaped concavity with a spout end 29 tapering downwardly towards the outer edge of the first body portion 26. The depression of the trough 30 opens the spout end 29 to the interior of the control ring 40, depending on their relative positions, the significance of which will be detailed herein.

Figure 7A:
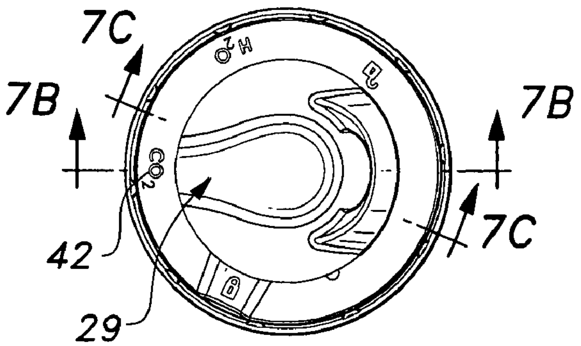
FIG. 7A is a top view of the carbonation device according to the present invention in a carbonation position.
Figure 7B:
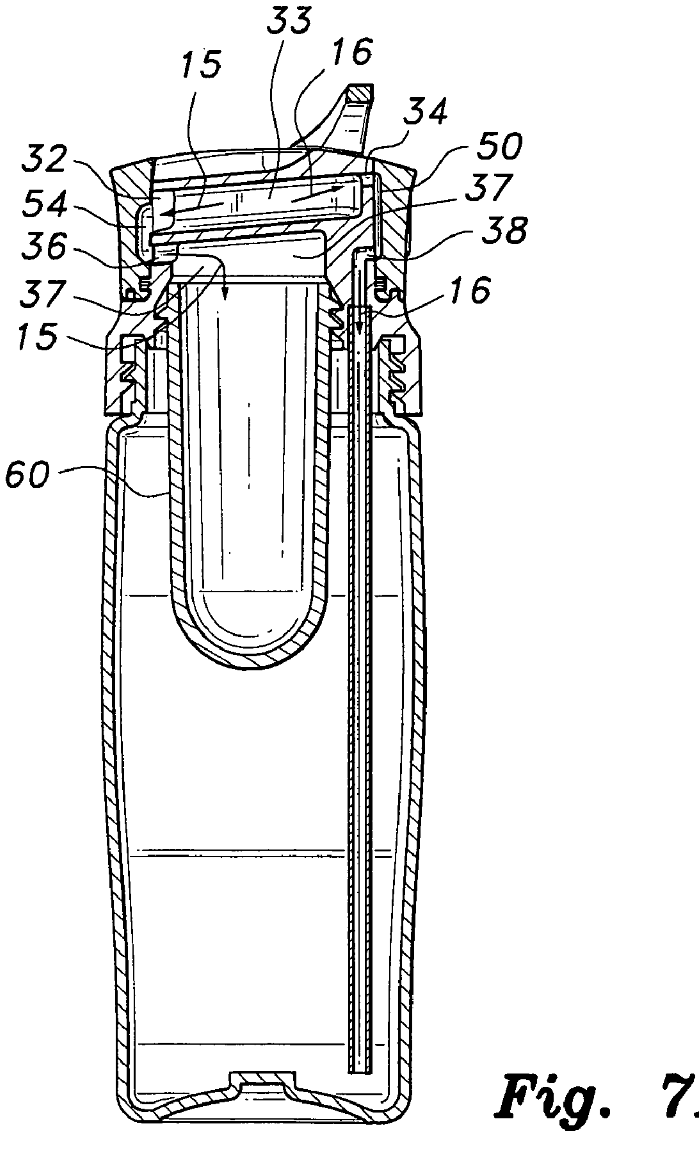
FIG. 7B is a section view taken along lines 7B-7B of FIG. 7A, showing the flow of gas into the distribution tube.

An elongate, arcuate water inlet port 32 is formed below the spout end 29. The port 32 opens into a central, water chamber or cavity 33 (shown in FIG. 5B) inside the first body portion 26. The water chamber 33 is dimensioned to hold enough water to initiate and produce the desired carbonation. As shown in FIGS. 5B and 7B, a partition 23 separates the water chamber 33 from an inlet chamber or cavity 37. The inlet chamber 37 includes an inlet port 36 and serves as an intermediate space or zone through which water and carbonating gas may pass into and out of the reaction vessel 60. The inlet chamber 37 also includes internal threads 28 for securing the reaction vessel 60 thereto via corresponding external threads 62. Other types of securing means such as snap fit configurations may also be used to secure the reaction vessel 60 to the cap 20. The distribution straw or tube 70 may be mounted to an outlet port 21 adjacent the inlet chamber 37. It is noted that while the use of the distribution straw 70 is preferable for carbonating the liquid, carbonation may also be obtained by utilizing the outlet port 21 alone.

Figure 3A:
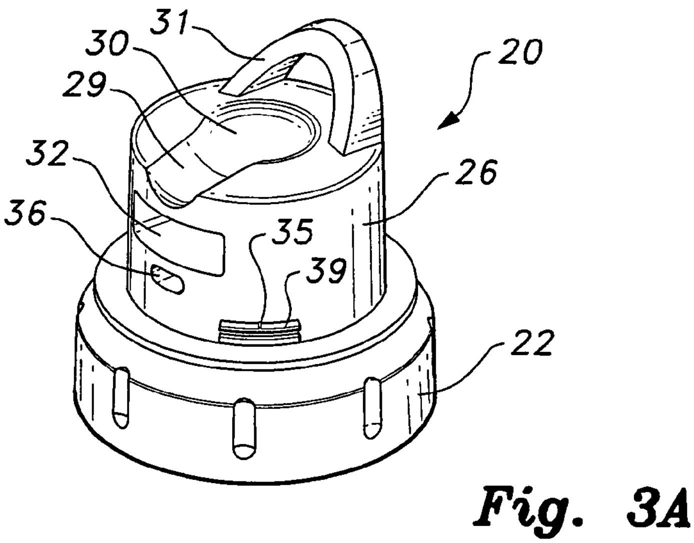
FIG. 3A is a front perspective view of the cap for the carbonation device according to the present invention.
Figure 3B:
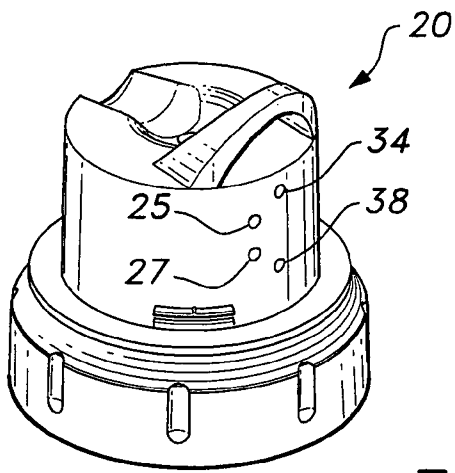
FIG. 3B is a back perspective view of the cap for the carbonation device according to the present invention.

Referring to FIGS. 3A, 3B and 7B, the water chamber 33 is sloped or tapered, i.e., one side is higher than the other, for efficient delivery of the water to the reaction vessel 60 in a subsequent stage of the carbonation process. To ease water collection inside the water chamber 33, a first vent or vent hole 34 is formed at the back of the first body portion 26 diametrically opposite the water inlet port 32. The first vent 34, when aligned with the control ring 40 in one position, allows air to escape the water chamber 33 during the filling process. While the first vent 34 helps filling the water chamber 33 with water in the above position of the control ring 40, in another position, the first vent 34 also directs carbonating gas from the water chamber 33 into the distribution tube 70 through the interaction of an associated groove in the control ring 40, further detailed below and a second vent, vent hole, or gas outlet 38 disposed below and collinear with the first vent 34.

Figure 3C:
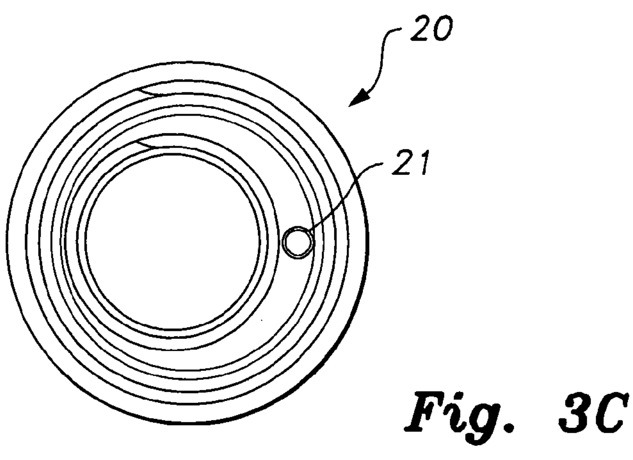
FIG. 3C is a bottom perspective view of the cap for the carbonation device according to the present invention.
Figure 7C:
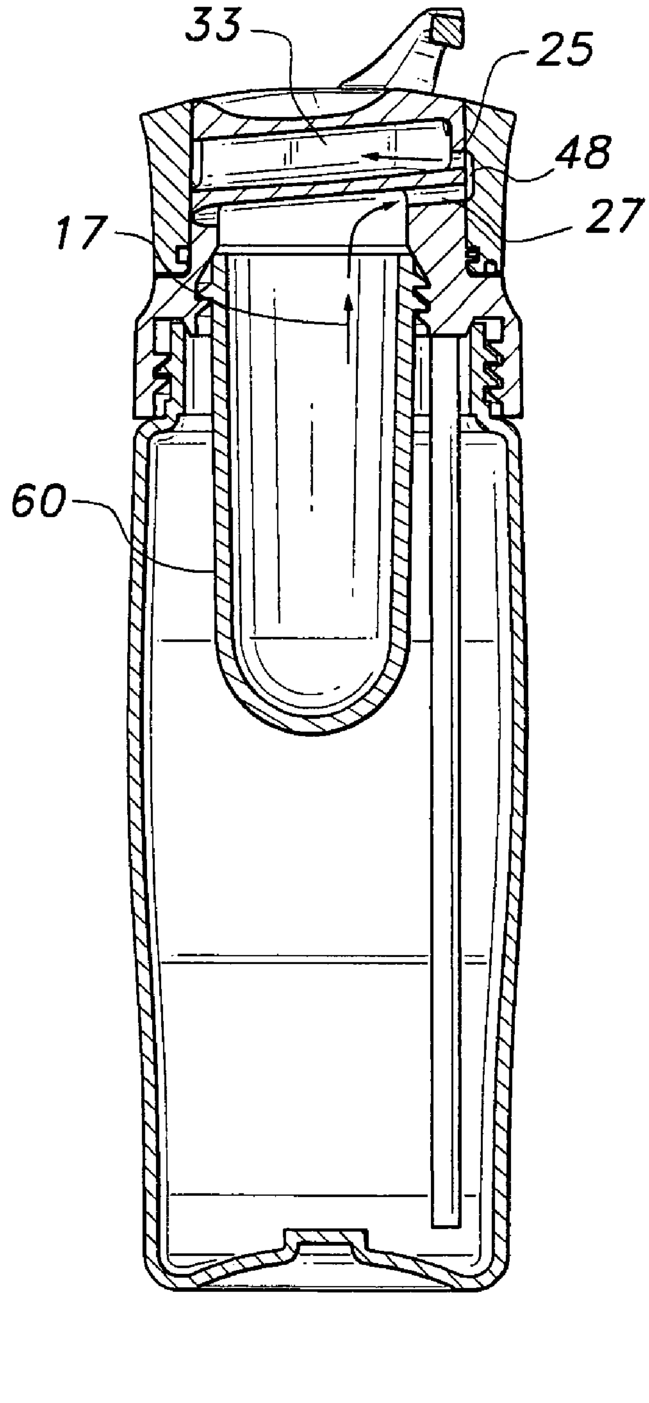
FIG. 7C is a section view taken along lines 7C-7C of FIG. 7A, showing flow of gas to the water chamber.

The rear of the first body portion 26 also includes a second set of vents for passing carbonating gas from the reaction vessel 60 into the water chamber 33. With reference to FIGS. 3C and 7C, the second set of vents includes a third vent, vent hole or gas inlet 25 and a fourth vent, vent hole or gas outlet 27. The third vent 25 is disposed slightly below and angularly offset from the first vent 34. The third vent 25 communicates with the water chamber 33 to allow the carbonating gas from the reaction vessel 60 to flow into the water chamber 33. The fourth vent 27 is disposed below and parallel to the third vent 25. The partition 23 separates the third and fourth vents 25, 27. The vents 25, 27, through the interaction of an associated groove in the control ring 40, serve to pass the carbonating gas from the reaction vessel 60 into the water chamber 33.

Figure 4B:
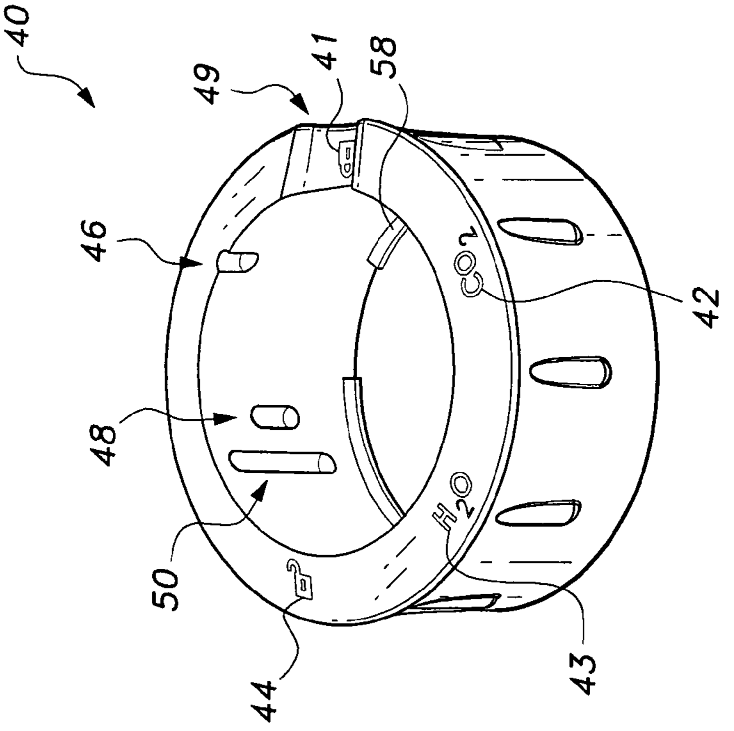
FIG. 4B is a back perspective view of the control ring for the carbonation device according to the present invention.
Figure 4A:
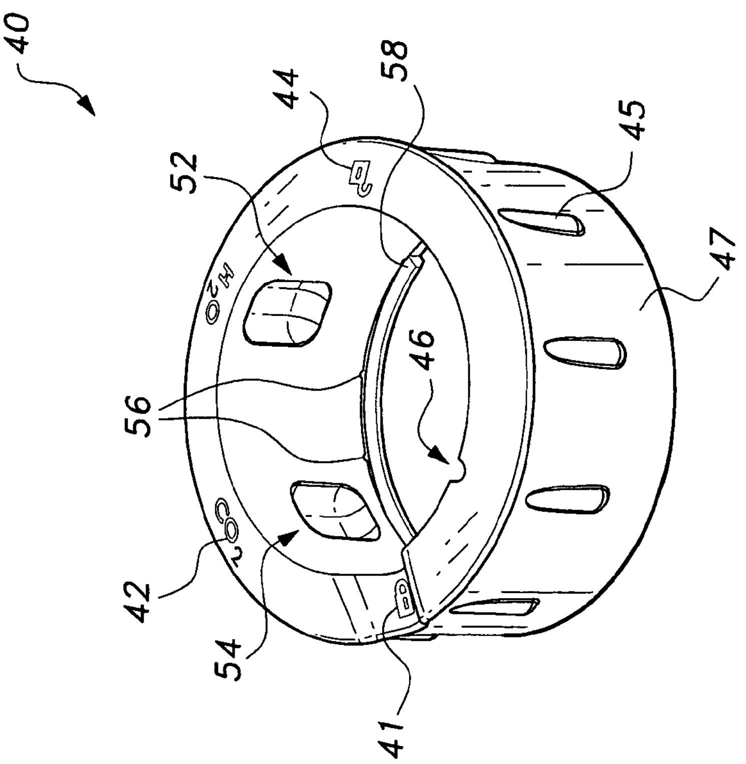
FIG. 4A is a front perspective view of the control ring for the carbonation device according to the present invention.

As shown in FIGS. 4A and 4B, the control ring or valve 40 may be a substantially cylindrical, annular ring having a plurality of control grooves disposed or formed in the interior wall thereof, the details of which will be further discussed below. The control ring 40 is adapted to be rotatably mounted around the first body portion 26 of the cap 20. To facilitate secure operative engagement therebetween, the control ring 40 includes at least two discontinuous interior flanges or tabs 58 projecting radially inwardly from near the bottom of the interior of the control ring 40. A plurality of locking notches or indentions 56 are spaced above the flanges 58 at predefined positions around the interior circumference of the control ring 40. Each notch indention 56 corresponds to a selected control position for operation of the carbonation device 10. The spacing between the locking indentions 56 and the flanges 58 define a channel or rail for slidable support of the rotation tab or flange 39 disposed on the first body portion 26. As shown in FIGS. 3A and 3B, the first body portion 26 includes at least two rotation tabs 39 extending radially outwardly from the exterior surface of the first body portion 26. Each rotation tab 39 includes a locking protuberance 35 engageable with the locking indentions 56 in the control ring 40 when assembled. Thus, the rotation tab 39 rides in the channel or rail defined by the locking indentions 56 and the flanges 58, and the interaction between the locking protuberances 35 and the locking indentions 56 locks the relative positions of the control ring 40 about the cap 20 for select operations of the carbonation device 10.

The top surface of the control ring 40 includes a plurality of indicia 41, 42, 43, 44 angularly spaced about the axis of the control ring 40. Each indicium may be placed thereon by molding, printing, etching or other similar processes. Each indicium represents a particular operative position of the carbonation device 10. For example, the first or locking indicium 41 corresponds to a rotated position of the control ring 40 about the cap 20 in which none of the ports or vents is aligned with each other and the control ring 40 may not be removed from the cap 20. Note that the locking indicium 41 is disposed in the drain groove, depression or mouth 49. The drain mouth 49 aligns with the spout end 29 of the water trough 30 when in the locked position so that both the drain mouth 41 and the spout end 29 form a continuous taper to allow easy disposal of excess water in the water trough 30. The second or $CO_2$ indicium 42 corresponds to a relative position of the control ring 40 where ports and vents are aligned to allow saturation of the liquid in the bottle 12 with carbonating gas. The third or $H_2O$ indicium 43 corresponds to a relative position of the control ring 40 where ports and vents are aligned to fill the water chamber 33. The fourth or unlocked indicium 44 corresponds to the relative position of the control ring 40 where the rotation tabs 39 are aligned with the gaps between the flanges 58 so that the control ring 40 may be lifted or removed from the cap 20 for cleaning.

To ensure that the control ring 40 is positioned correctly for each operation, the spout end 29 serves as a pointer for the desired indicia 41, 42, 43, 44, the correct positioning being further ensured by the locking indentations 56 and the locking protuberances 35. In a corresponding manner, aligning the spout end 29 to the desired indicia 41, 42, 43, 44 also aligns corresponding ports and vents between the cap 20 and the control ring 40 for the selected operation. For example, when the control ring 40 is rotated to the $H_2O$ position ($H_2O$ indicium 43), the inlet port 32 is aligned with the first control groove 52, which allows water to flow down the spout end 29 to the interior water chamber 33. Concurrently, the first vent hole 34 at the rear of the water chamber 33 aligns with a first vent control groove 46 to allow air to escape during filling of the water chamber 33. When the control ring 40 is rotated to the $CO_2$ position, $CO_2$ indicium 42, the inlet ports 32, 36 align with a second control groove 54, which permits the water from the water chamber 33 to drain into the reaction vessel 60 through the inlet chamber 37. At the same time, the first vent hole 34 and the second vent hole 38 align with the second vent control groove 50 to permit carbonating gas flow into the distribution tube 70 from the water chamber 33. Moreover, in this position, the third and fourth vent holes 25, 27 are aligned with third vent control groove 48 so that the carbonating gas from the reaction vessel 60 may be directed into the water chamber 33. For effective operation of the control ring 40, the outer surface thereof may include grip enhancement features, such as the protrusions 45 shown in the drawings.

The reaction chamber or vessel 60 may be a substantially hollow body closed at one end and open at the other. The open end includes threads 62 for securing the reaction vessel 60 to the cap 20. The outer surface of the reaction vessel 60 may also include grip-enhancing protrusions 64 to assist in mounting. Other types of grip enhancing features may also be included. The hollow reaction vessel 60 is adapted to receive a quantity of carbonating material, such as sodium bicarbonate and citric acid, either in powder or tablet form. By mixing the sodium bicarbonate and citric acid with water, carbonating gas, such as $CO_2$, may be formed therein and distributed.

The distribution straw or tube 70 may be mounted to an outlet port 21 adjacent the inlet chamber 37, which forces the carbonating gas to exit near the bottom of the bottle 12. This allows more time to suffuse the liquid with effervescence, since the gas remains in the liquid for a longer period before the gas rises to the surface. The end of the distribution tube 70 may also include a diffusion or air dispersion stone, which breaks up the gas bubbles into a fine mist, enhancing diffusion of the gas into the liquid.

Figure 5A:
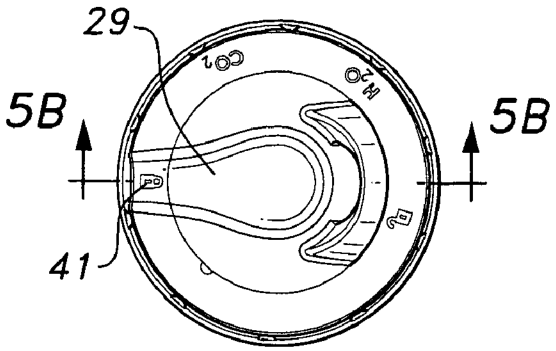
FIG. 5A is a top view of the carbonation device according to the present invention in a locked position.
Figure 5B:
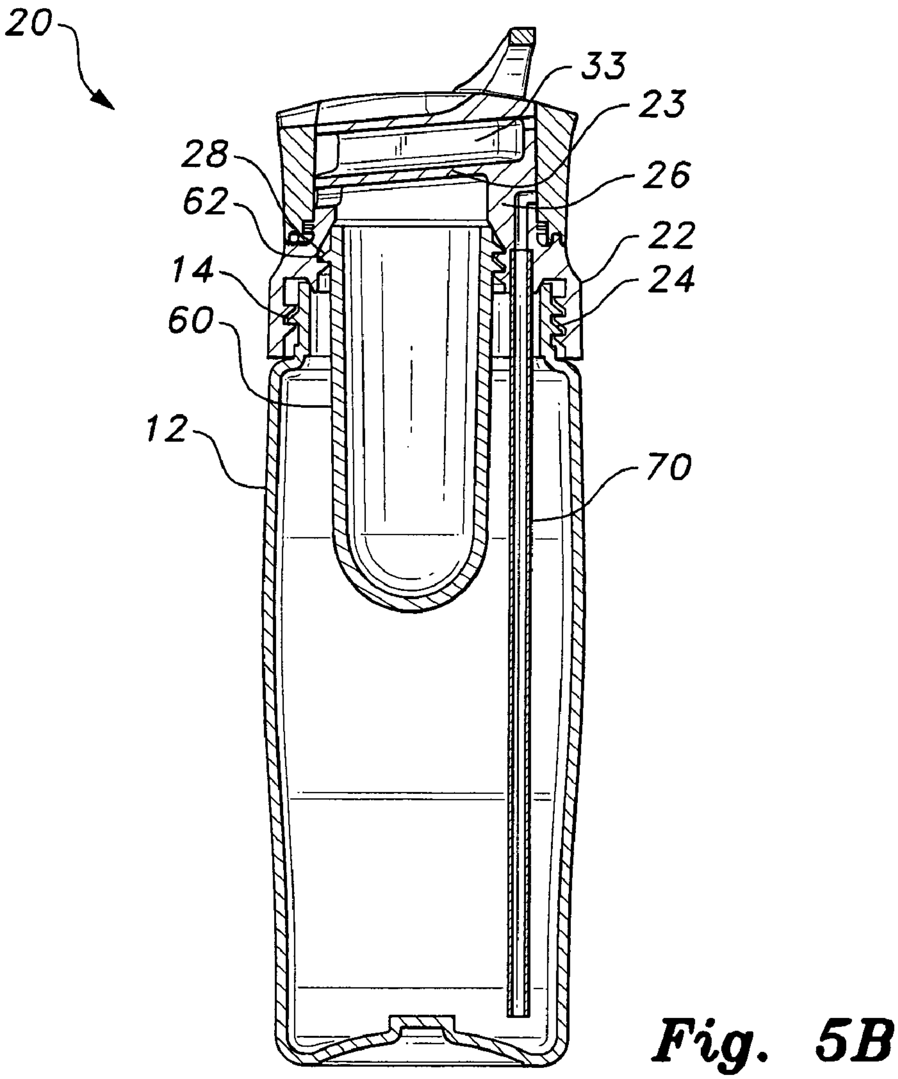
FIG. 5B is a section view taken along lines 5B-5B of FIG. 5A.

Turning to FIGS. 5A-8B, the following describes how to use the carbonation device 10. Referring to FIGS. 5A and 5B, these drawings show the carbonation device 10 in the locked position. In this position, the control ring 40 may not be removed from the cap 20 due to the engagement between the respective flanges 38 and the rotation tabs 39. Moreover, none of the ports or vents is aligned with each other. This position is an ideal position for carrying and transport of the carbonation device, and is necessary for shaking the bottle 12 when carbonating the drink.

When a carbonated drink is desired, the user disassembles the carbonation device 10 to gain access to the reaction vessel 60. The user fills the reaction vessel 60 with a desired amount of carbonation producing material, such as sodium bicarbonate and citric acid in stoichiometrically balanced proportions. Then the reaction vessel is mounted to the cap 20 and the carbonation device 10 is reinstalled onto the bottle 12.

Figure 6A:
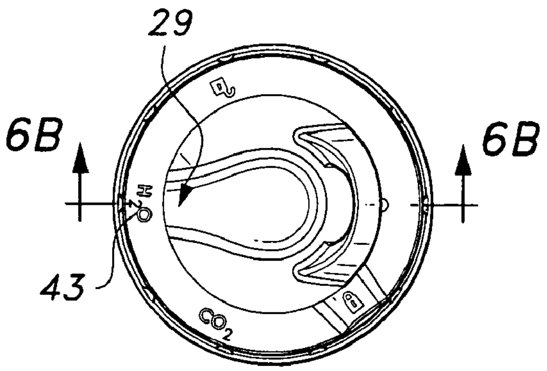
FIG. 6A is a top view of the carbonation device according to the present invention in a water-introducing position.
Figure 6B:
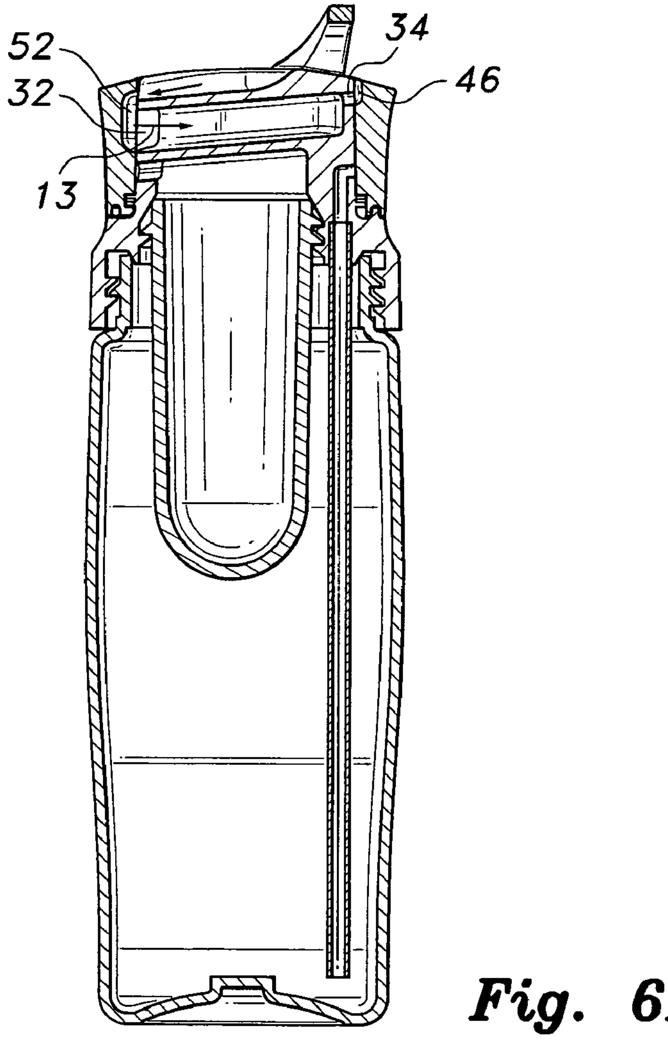
FIG. 6B is a section view taken along lines 6B-6B of FIG. 6A.

In preparation for producing the effervescence, a solvent, i.e., water, must be mixed with the sodium bicarbonate and citric acid. As shown in FIGS. 6A and 6B, the user rotates the control ring 40 to the $H_2O$ position to gather the desired amount of water. In this position, the spout end 29 is aligned with the top portion of the first control groove 52 due to the tapered disposition of the spout end 29, and the inlet port 32 is aligned with the rest of the first control groove 52. The user pours the desired amount of water into the water trough 30 to thereby allow the water to drain through the spout end 29, first control groove 52, and the inlet port 32 into the water chamber 33, as indicated by arrow 13. Concurrently, the first vent hole 34 at the rear of the water chamber 33 is aligned with the first vent control groove 46, which vents any air inside the water chamber 33 to the atmosphere as the chamber 33 fills with water. To maximize delivery of water into the water chamber 33, the first control groove 52 is formed with relatively wide dimensions.

Once the required amount of water has been collected in the water chamber 33, the water must be introduced to the reagents. As shown in FIGS. 7A-7C, the user rotates the control ring 40 to the $CO_2$ or carbonation position to drain the water into the reaction vessel 60. In this position, the inlet port 32 and the inlet port 36 are both aligned with the second control groove 54. This position transfers the collected water from the water chamber 33 through inlet port 32, the second control groove 54, and the inlet port 36 into the reaction vessel 60 via the intermediate chamber 37, as indicated by arrow 15. Similar to the first control groove 52, the second control groove 54 may also be formed with wide dimensions to maximize delivery of water. The water reacts with the reagents to produce $CO_2$, foam, and other byproducts or slurry. The user allows the reaction to continue to pressurize the reaction vessel 60 for about thirty seconds. The backpressure in the reaction vessel 60 prevents the foam from escaping, thus helping to reduce the chances of contaminating the liquid with unwanted byproducts. At the same time, the $CO_2$ gas exits the reaction vessel 60 through the fourth vent hole 27, and due to the alignment with the third vent control groove 48, transfers the gas into the water chamber 33 via the third vent hole 25 as indicated by arrow 17. This also pressurizes the water chamber 33, which helps to push much of the residual water in the water chamber 33 into the reaction vessel 60. The pressurized gas in the water chamber 33 then exits the water chamber 33 through the first vent hole 34, the second vent control groove 50 and the second vent hole 38 into the liquid contained in the bottle 12 via the distribution tube 70, as indicated by arrow 16, to commence carbonation.

After the initial pressurization and carbonation period, pressure within the reaction vessel 60 reaches close to normalized levels, resulting in reduced distribution of carbonating gas into the liquid. Thus, continual carbonation is required to reach the desired level of effervescence. To facilitate this, the user rotates the control ring 40 to the locked position, wherein all the ports and vents are closed. The user then vigorously shakes the bottle for about fifteen seconds to increase and enhance production of $CO_2$, which builds pressure back up to desired levels. After shaking of the bottle 12, the control ring 40 is rotated back to the carbonation position, which immediately releases the pressurized gas into the water chamber 33 and to the liquid. This shaking and releasing process is repeated for about five minutes, or until the desired carbonation has been reached and the beverage is ready to be enjoyed. It is noted that best results may be obtained by keeping the bottle 12 in a vertical position at each stage of the process, with shaking the bottle 12 being the possible exception.

Figure 8A:
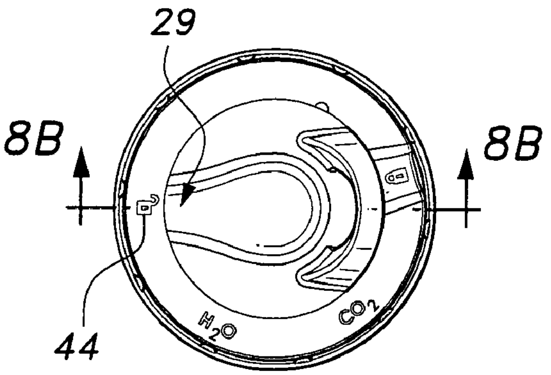
FIG. 8A is a top view of the carbonation device in an unlocked position according to the present invention.
Figure 8B:
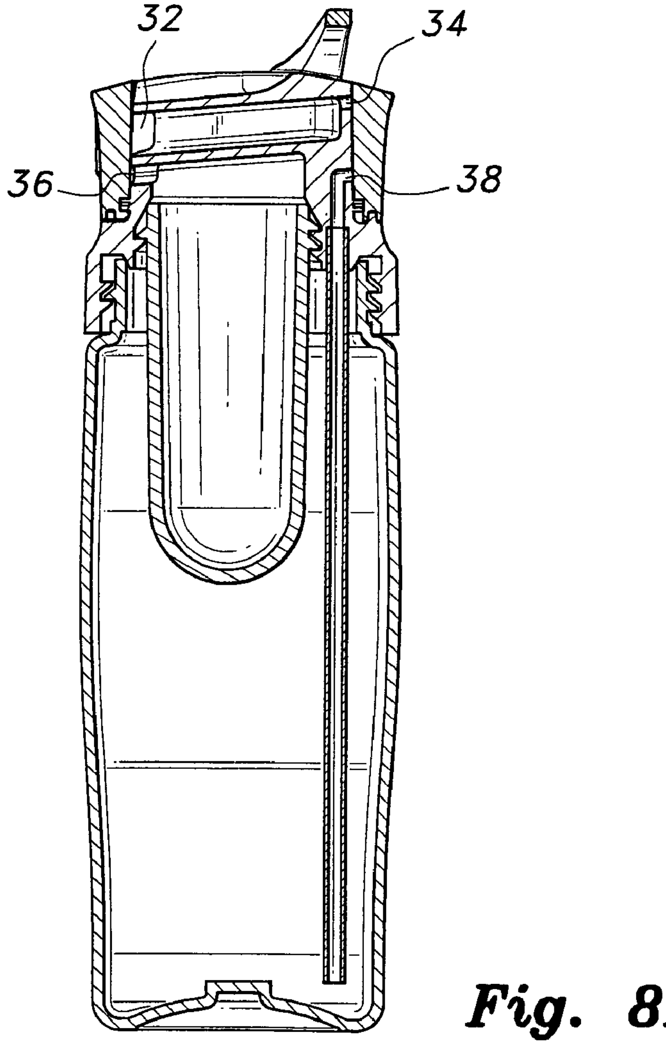
FIG. 8B is a section view taken along lines 8B-8B of FIG. 8A.

The carbonation device 10 requires periodic cleaning or maintenance. To facilitate cleaning, the user rotates the control ring 40 into the unlocked position, as shown in FIGS. 8A and 8B. In this position, each of the rotation tabs 39 on the cap 20 are aligned with a gap between the flanges 58 in the control ring 40, the gap providing a free space through which the control ring 40 can be lifted or removed from the cap 20. Now all the vent holes, ports and the chambers may be flushed out with water or mild detergent. If a thorough cleaning is not necessary, a simple rinse of the reaction vessel 60 with water to dispose of the byproducts may be sufficient.

Thus, it can be seen that the carbonation device 10 is a compact, efficient apparatus for producing carbonated beverages on demand. The ports, vents and the various chambers, in conjunction with selective positioning of the control ring 40, perform all the functions necessary for producing and delivering the carbonating gas. The efficient use of the produced gas and associated pressure minimizes the chances of unwanted byproducts being introduced into the liquid. Moreover, an added benefit of the endothermic reaction is that it cools the carbonating device 10, which slightly chills the beverage simultaneously. The construction of the carbonation device 10 permits easy assembly and disassembly for storage, travel and cleaning.

Turning to FIGS. 9A-11, these drawings disclose alternative embodiments of a carbonation device for timed release of carbonating gas. In these alternative embodiments, sodium bicarbonate and citric acid tablets in stoichiometrically balanced proportions, are used as reactants. The tablets are coated with a water-soluble layer that dissolves over a relatively short period of time when immersed in water. The exposed reactants then react with the water to produce carbonating gas, i.e., $CO_2$, which is dispersed into the beverage to be carbonated.

Figure 9A:
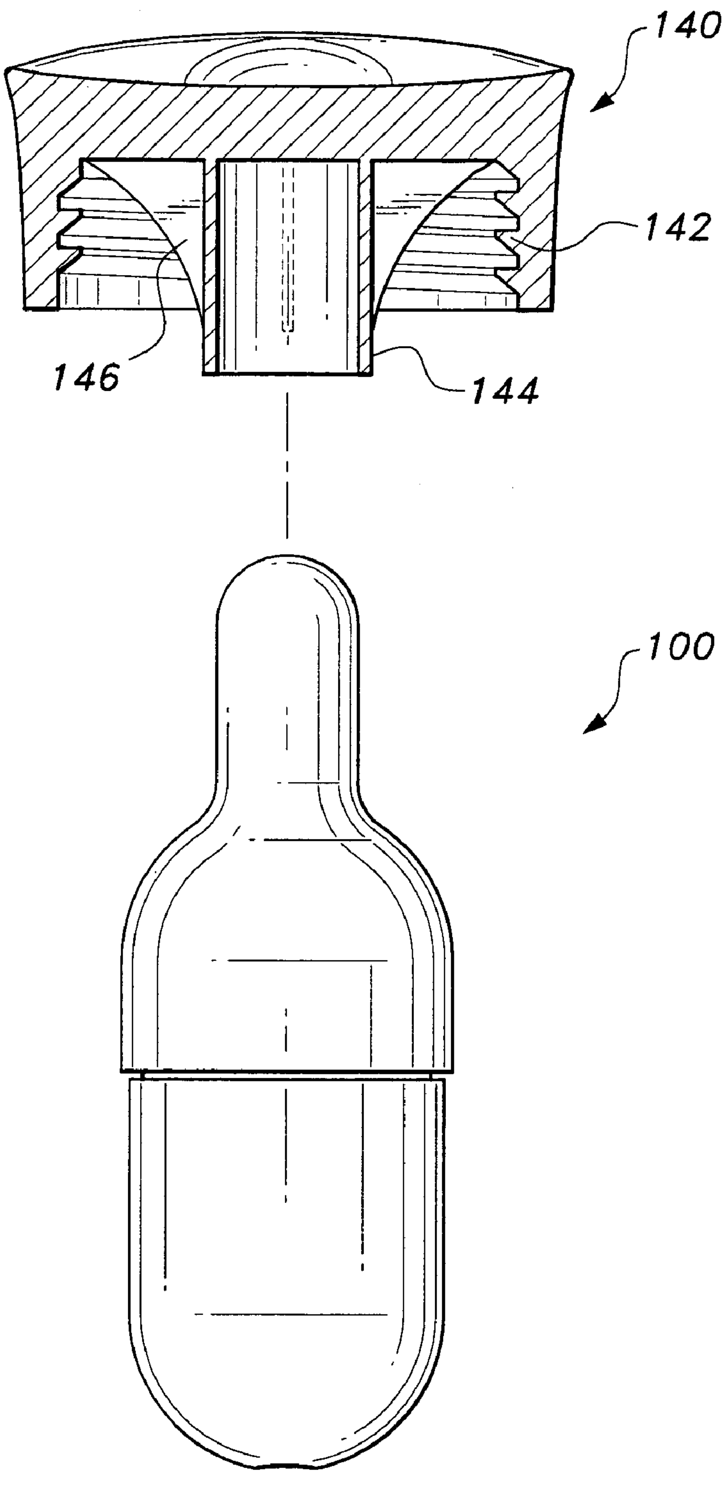
FIG. 9A is an exploded view of an alternative embodiment of a carbonation device according to the present invention.
Figure 9B:
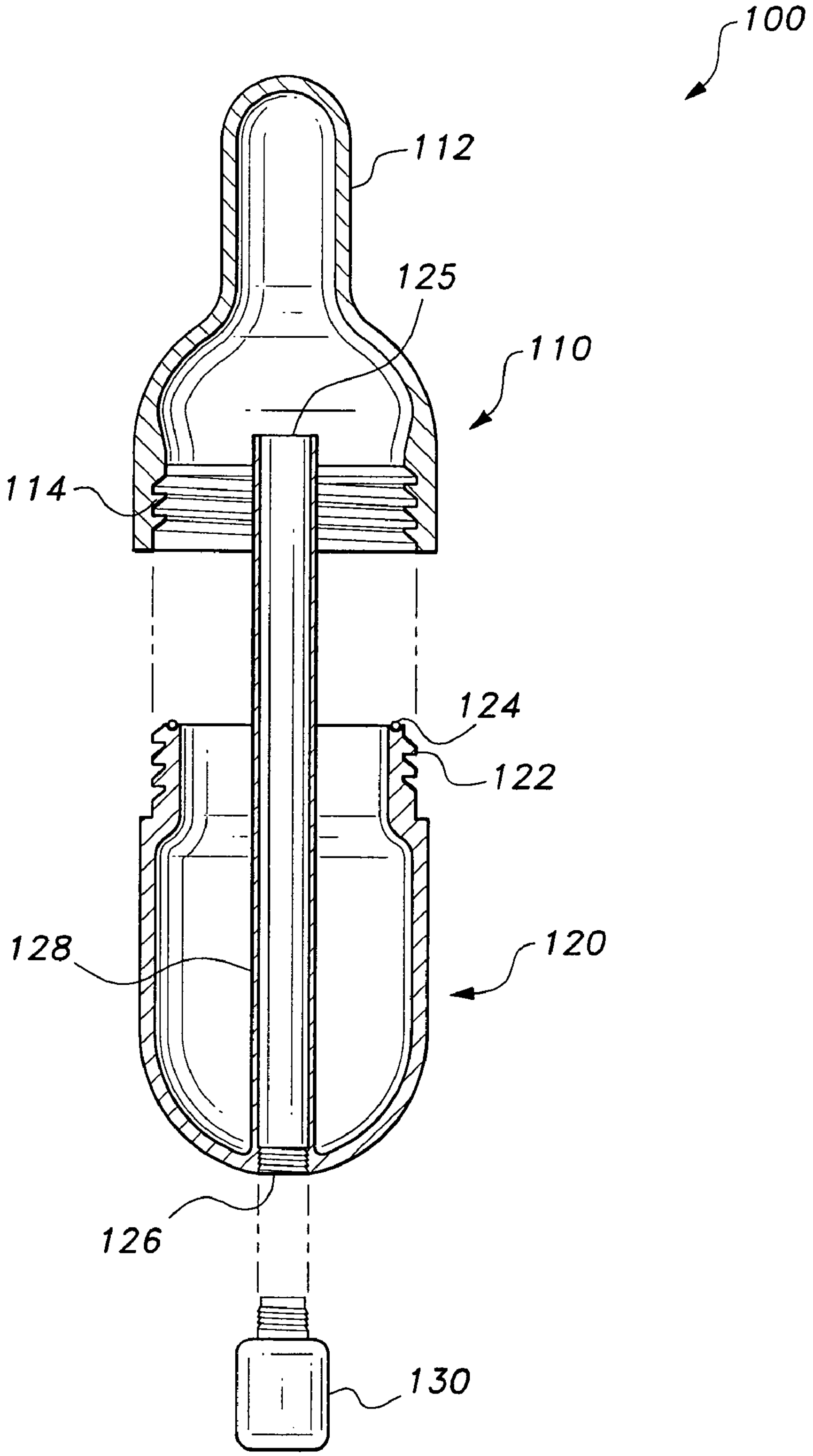
FIG. 9B is an exploded front view in section of the carbonation device of FIG. 9A.

As shown in FIGS. 9A and 9B, the carbonation device 100 includes an ampoule shaped, drop-in capsule comprised of a first upper or top body portion 110 and a second lower or bottom body portion 120. Both the upper and lower body portions 110, 120 are connected to each other by mating threads 114, 124. An O-ring or gasket 124 ensures an airtight and watertight seal between the two bodies. When assembled, it is preferable that the carbonation device 100 has a height slightly less than the height of the bottle, container, or canteen in which the carbonation device 100 will be placed to ensure that the carbonation device 100 will not lie on its side. Similar results may be had by having the height of the carbonation device 100 be greater than the width of the container opening for most wide-mouth bottles or containers. In this manner, even if the carbonation device 100 is not vertically supported, the carbonation device 100 may still maintain a substantially vertical orientation. This helps to ensure that the slurry or byproducts of the endothermic reaction will not readily escape into the beverage to be carbonated. Moreover, either the upper body portion 110 or the lower body portion 120 may include a measuring mark or watermark molded, printed, or etched thereon as an indicator for the amount of water to be poured therein.

The lower body portion 120 may be a hollow, substantially cylindrical tank similar in form to the reaction vessel 60 mentioned above. Similarly, the lower body portion 120 functions as a reaction vessel or chamber where the reactants and water will be mixed. An elongate distribution tube or straw 128 is centrally disposed in the lower body portion 120 and extends into the narrow neck portion 112 of the upper body portion 110 when assembled. Consequently, the height of the distribution tube 128 is slightly less than the interior height of the assembled carbonation device 100 so that the pressure of the produced gas will be increased within the neck portion 112 and the gas will thereby be forced to funnel into the inlet 125 of the distribution tube 128. The outlet 126 of the distribution tube 128, disposed at the bottom of the lower body portion 120, includes mating threads 126 for attaching an air stone or diffusion stone 130. Of course other attachment means may be used to fasten the diffusion stone 130 to the outlet 26. The funneled gas exits through the outlet 126 and the diffusion stone 130 to thereby produce fine bubbles of gas to be absorbed by the beverage.

As mentioned previously, best results for minimal byproduct contamination are obtained by maintaining the vertical orientation of the carbonation device 100. To further ensure this disposition, the carbonation device 100 may include a holding cap or lid 140 adapted to be mounted to the mouth of the bottle or container via threads 142. The holding cap 140 includes a centrally disposed female socket 144 to which the neck portion 112 may be insertably mounted. Reinforcing ribbing 146 radially extend from the socket 144 to ensure a tight fit between the socket 144 and the neck portion 112. Alternatively, the connection between the neck portion 112 and the socket 144 may be accomplished with snap-fit engagement means or threading.

Figure 10A:
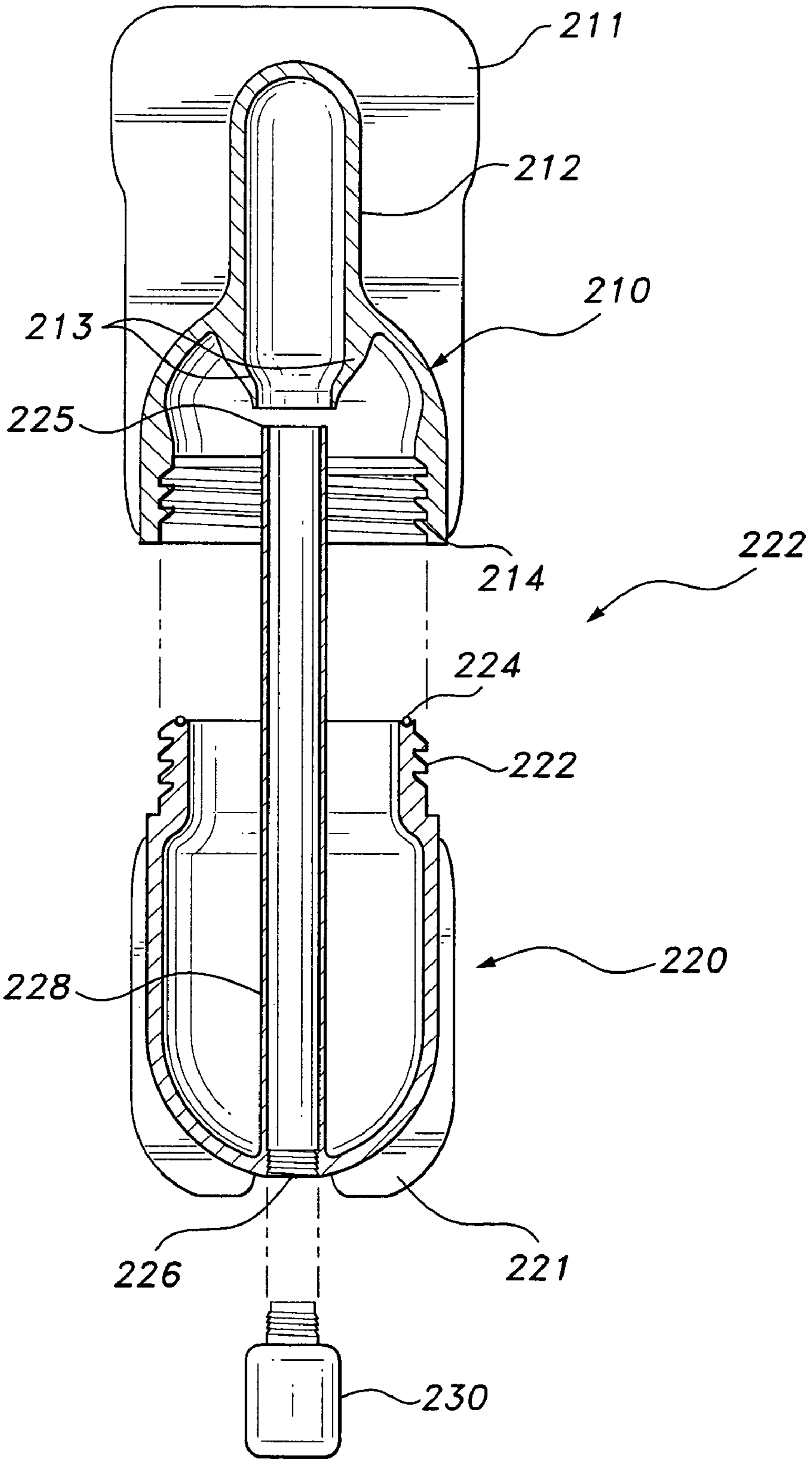
FIG. 10A is an exploded front view in section of another alternative embodiment of a carbonation device according to the present invention.
Figure 10B:
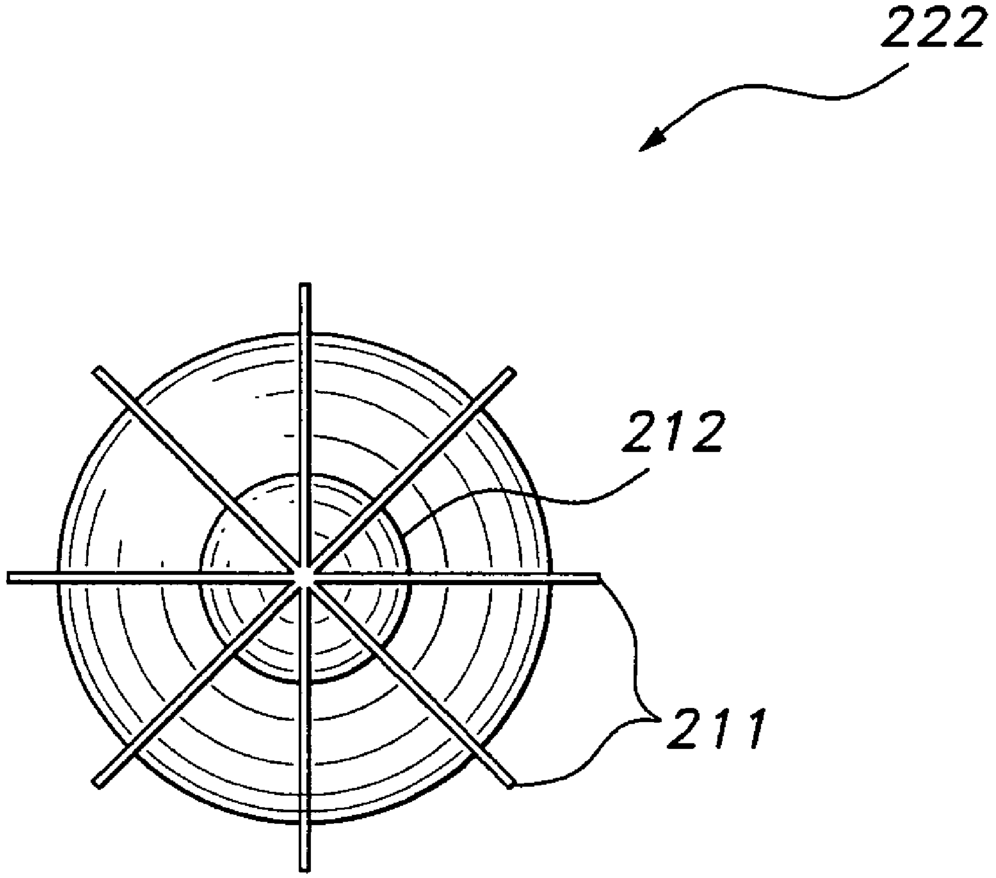
FIG. 10B is a top view of the carbonation device of FIG. 10A.

Referring to FIGS. 10A and 10B, these drawings disclose an alternative carbonation device 200 similar to the carbonation device 100 mentioned above but configured to stand alone inside the beverage bottle or container. In that regard, the carbonation device 200 includes an ampoule shaped, drop-in capsule comprised of a first upper or top body portion 210 mated to a second lower or bottom body portion 220 via mating threads 214, 222; a sealing O-ring or gasket 224; an elongate distribution tube or straw 228 extending into a narrow neck portion 212 of the upper body portion 210 when assembled, the distribution tube 228 having an inlet 225 and an outlet 226; and a detachably mounted diffusion stone 230 connected to the outlet 226. In addition, either the upper body portion 210 or the lower body portion 220 may include a measure mark or watermark molded, printed or etched thereon as an indicator for the amount of water to be poured therein. The carbonation device 200 functions substantially similar to the carbonation device 100 and the process thereof will be detailed below.

The carbonation device 200 also includes several features for increasing stability and ergonomic handling of the carbonation device 200. In that regard, the upper body portion 210 includes a plurality of radiating fins 211. The lower body portion 220 also includes similar radiating fins 221. The fins 211, 221 provide increased structural integrity, as well as grip enhancement for the user when assembling or disassembling the carbonation device 200. In addition, the upper body fins 211 each include an enlarged area at the top of the upper body portion 210 having a width adapted for a snug or interference fit engagement with the opening of the bottle or container. In this manner, the carbonation device 200 can maintain a vertical orientation with respect to the bottle when inserted therein without the necessity of a lid similar to the lid 140 of the carbonation device 100.

In addition to the above, the carbonation device 200 includes features for minimizing or preventing undesirable byproducts or slurry from entering the beverage to be carbonated. As shown in FIG. 10A, the upper body portion 210 includes a slurry shield 213 depending downwardly from the neck portion 212. The slurry shield 213 surrounds the upper portion of the distribution tube 228 and is dimensioned to provide a gap between the slurry shield 213 and the distribution tube 228. Thus, the carbonating gas may still pass into the inlet 225 while foam and solid byproducts may be prevented from entering the neck portion 212.

The following describes how the carbonation devices 100, 200 produce a carbonated beverage. In preparation, the lower body portion 120, 220 is detached from the upper body portion 110, 210 and filled with a preselected amount of sodium bicarbonate and citric acid tablets coated with a water-soluble layer. The user pours in a corresponding amount of water into the lower body portion with the assistance of a watermark if needed. The lower body portion 120, 220 is reattached to the upper body portion 110, 210. In the amount of time required for the water to dissolve the water-soluble layer, the user may then insert the carbonation device 100, 200 into the bottle or container. With respect to the carbonation device 100, the capsule may be dropped in alone, or be mounted to the lid 140, maintaining the desired substantially vertical orientation. With respect to the carbonation device 200, the user simply presses the carbonation device 200 into the bottle opening due to the snug fit of the fins 211 therein, which ensures vertical orientation of the carbonation device 200 with respect to the bottle. As the endothermic reaction proceeds, the user may gently agitate the bottle or container to speed the carbonation process. The pressure build up of the carbonating gas funnels the gas through the distribution tube 128, 228 and the gas is dispersed into the beverage through the diffusion stone 120, 220. When the desired effervescence has been reached, the carbonated beverage is ready to be enjoyed.

Figure 11:
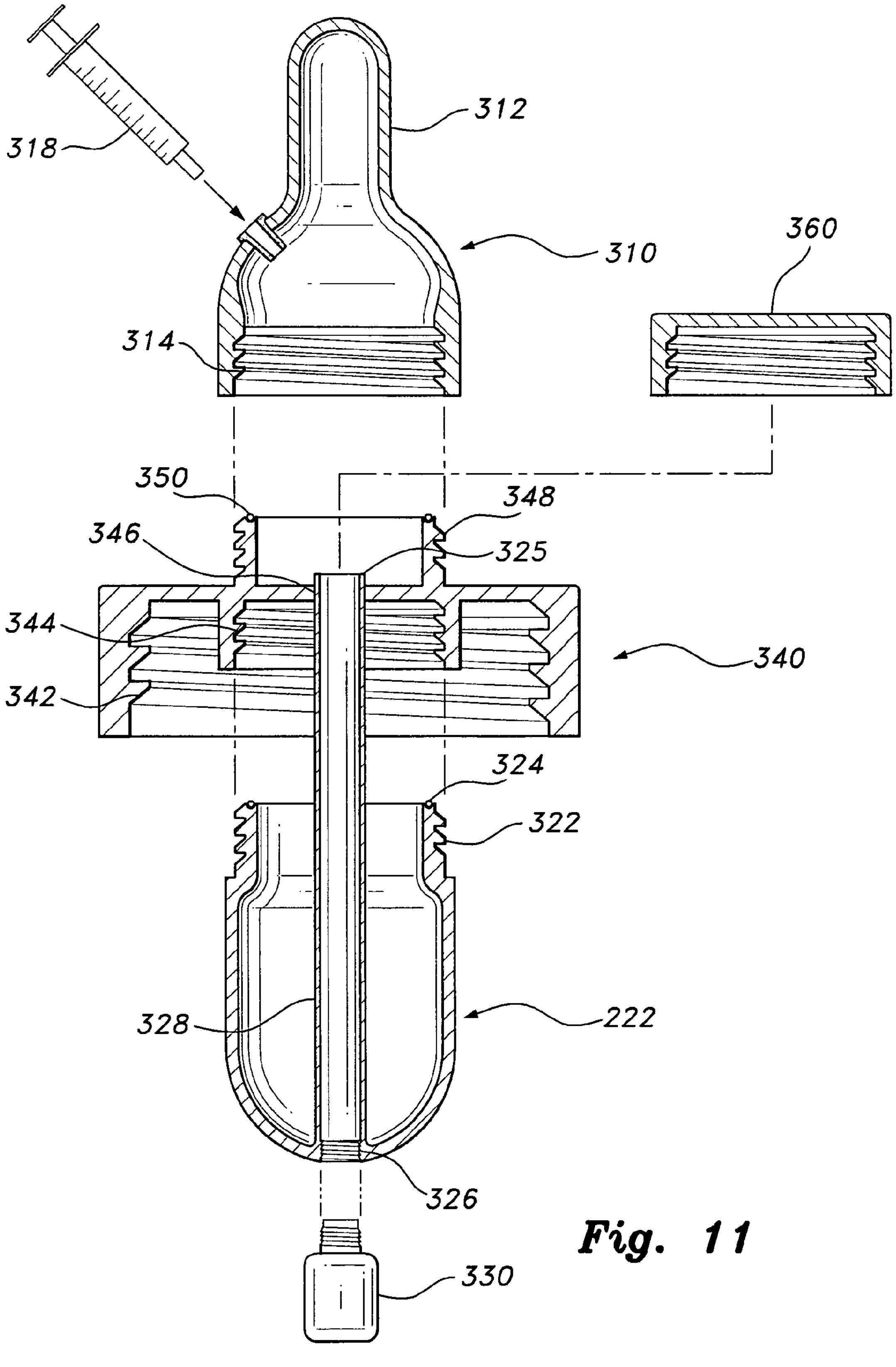
FIG. 11 is an exploded front view in section of another alternative embodiment of a carbonation device according to the present invention.

Referring to FIG. 11, this drawing discloses a further alternative embodiment of a carbonation device 300 similar to the carbonation device 100 but configured more as a fixed capsule instead of a drop-in. In that regard, the carbonation device 300 includes an ampoule-shaped, drop-in capsule comprised of a first upper or top body portion 310 that may be mated to a second lower or bottom body portion 320 via mating threads 314, 322; a sealing O-ring or gasket 324; an elongate distribution tube or straw 328 extending into a narrow neck portion 312 of the upper body portion 210 when assembled, the distribution tube 328 having an inlet 325 and an outlet 326; and a detachably mounted diffusion stone 330 connected to the outlet 326. In addition, either the upper body portion 310 or the lower body portion 320 may include a measure mark or watermark molded, printed or etched thereon as an indicator for the amount of water to be poured therein. The carbonation device 300 functions substantially similar to the carbonation device 100 and the process thereof will be detailed below.

To rigidly mount the capsule to a bottle or container opening in a vertical orientation, the carbonation device 300 includes a lid or cap assembly 340. The bottom portion of the cap assembly 340 includes threading 342 for mounting the cap assembly 340 onto the bottle opening. Internal threading 344 concentrically disposed at the bottom of the cap assembly 340 is adapted to secure the lower body portion 320 thereon. In addition, the cap assembly 340 includes a central bore 346, which permits the distribution tube 328 to pass into the upper body portion 310. The upper portion of the cap assembly 340 includes threading 348 and a sealing O-ring or gasket 350 for securely mounting the upper body portion 310 via mating threads 314. When not in use, the upper and lower body portions 310, 320 may be removed completely or stored inside the bottle. As a consequence, an auxiliary cap 360 may selectively cover the opening at the threads 348.

Production of carbonating gas is similar for carbonation devices 100, 200, 300, but the carbonation device 300 is more efficient for using a powdered form of the reagents sodium bicarbonate and citric acid. In this embodiment, the carbonation device 300 includes a duckbill valve 315 disposed on a side of the upper body portion 310. By using a syringe 318, a preselected amount of water may be introduced into the enclosed capsule through the duckbill valve 316. Once the endothermic reaction commences, the carbonating gas is dispersed into the liquid in the same manner as the carbonation devices 100, 200.

As with the carbonation device 10, the alternative carbonation devices 100, 200, 300 are compact, efficient apparatus for producing carbonated beverages on demand. The capsule shape efficiently delivers carbonating gas to the liquid and utilizes the associated pressure to minimize the chances of unwanted byproducts being introduced into the liquid. Moreover, the endothermic reaction provides some cooling to the beverage. Furthermore, the construction of the alternative carbonation devices 100, 200, 300 permits easy assembly and disassembly for storage, travel and cleaning.

It is to be understood that the carbonation devices 10, 100, 200, 300 encompass a wide variety of alternatives. For example, the carbonation devices 10, 100, 200, 300 are preferably made from durable plastic, but other materials, such as aluminum, steel, composites, wood or any combination thereof, may also be used. In addition, threading and other components may be sized to fit a variety of bottles and containers. Furthermore, the carbonation devices 10, 100, 200, 300 may include a variety of colors and indicia for aesthetic appeal, advertising, personal messaging or indicators of various components.

As a still further alternative to the above, a different kind of valve system may be used to collect and transfer water to a reaction vessel. For example, a rotatable trough may be used to collect a preselected amount of water in one position, and in another rotated position, dumps the water to a reaction vessel. Moreover, with respect to the carbonation device 10, the locations, shape and size of the various ports and vents in the cap 20 and the control grooves in the control ring 40 may be rearranged so long as they can be aligned to form pathways for the water and carbonating gas.

It is to be understood that the present invention is not limited to the embodiments described above, but encompasses any and all embodiments within the scope of the following claims.

I claim:

1. A carbonation device, comprising:

a substantially hollow first body having a cavity for holding and dispersing water and carbonating gas;

a substantially hollow, second body detachably mounted to the first body, the second body having an open end adapted to be mounted to the first body and a closed end, the second hollow body having a cavity for holding water and reactants to produce the carbonating gas;

a gas distribution means interconnected to the first and second hollow bodies for directing carbonating gas from the second hollow body into a beverage to be carbonated, the gas distribution means having an outlet port disposed at the bottom of the first body and an elongate tube operatively connected to the outlet port; and means for mounting the first hollow body to an opening of a beverage container.

2. A carbonation device, comprising:

a substantially hollow cap adapted to be mounted to an opening of a liquid container, the cap comprising;

a water dispensing means for holding and directing a quantity of water for producing carbonating gas;

a plurality of chambers for directing water and gas flow;

a plurality of ports for directing flow of water; and a plurality of vents for directing gas flow;

a substantially annular control ring coaxial with and selectively and rotatably mounted on the cap, the control ring having a plurality of control grooves selectively alignable with the ports and the vents in the cap to lock, collect water, carbonate, and unlock the control ring;

a reaction vessel mounted to the cap, the reaction vessel adapted to hold carbonating gas producing reactants to be mixed with the water, and a carbonating gas distribution system connected to the cap to dispense the carbonating gas into liquid held in the liquid container;

wherein rotation of the control ring to select positions about the cap allows a user to control various stages of producing the carbonating gas to obtain a carbonated beverage.

3. The carbonation device according to claim 2, wherein the water dispensing means comprises a substantially concave trough radially extending from top, center of the cap to an outer edge of the cap, the concave trough having a substantially circular concavity at the center of the trough and a tapering groove forming a spout adjacent the outer edge, the tapering groove tapering both downwardly and radially.

4. The carbonation device according to claim 3, wherein the plurality of chambers comprises:

a water chamber disposed below the trough, the water chamber having a sloped bottom surface; and an intermediate inlet chamber disposed below the water chamber, the inlet chamber being separated from the water chamber by a partition.

5. The carbonation device according to claim 4, wherein the plurality of ports comprises:

an elongate, curved water chamber port spaced below the spout, the water chamber port opening into and communicating with the water chamber; and an elongate, curved inlet chamber port spaced below the water chamber port, the inlet chamber port opening into and communicating with the inlet chamber.

6. The carbonation device according to claim 5, wherein the plurality of vents comprises:

a first vent formed on a side of the water chamber opposite the water chamber port;

a second vent disposed below the first vent, the second vent communicating with the carbonating gas distribution system;

a third vent disposed below and angularly offset from the first vent, the third vent communicating with the water chamber; and a fourth vent disposed below the third vent, the fourth vent communicating with the inlet chamber.

7. The carbonation device according to claim 6, wherein the plurality of control grooves are formed on an interior surface of the control ring, the plurality of control grooves comprising:

a first control groove for directing water from trough to the water chamber;

a second control groove for directing water from the water chamber to the inlet chamber, the second control groove disposed below and angularly offset from the first control groove;

a first vent control groove for venting air from the water chamber;

a second vent control groove for venting carbonating gas from the water chamber to the carbonating gas distribution system; and a third vent control groove for venting carbonating gas from the reaction vessel to the water chamber.

8. The carbonation device according to claim 7, wherein the control ring is rotatable to preselected locked, water, carbonation, and unlocked positions.

9. The carbonation device according to claim 8, further comprising means for locking the control ring into the preselected locked, water, carbonation, and unlocked positions.

10. The carbonation device according to claim 9, wherein the means for locking the control ring into the preselected positions comprises:

at least two rotation tabs radially extending from the cap, each rotation tab being angularly spaced from each other, each tab having a locking protrusion thereon;

a plurality of angularly spaced locking indentions formed on an interior surface of the control ring; and at least two angularly spaced flanges extending radially inwardly from the interior surface of the control ring, the flanges being spaced from the locking indentions;

wherein the locking indentions and flanges form a channel that the rotation tabs may ride and mating between the locking protrusions and locking indentions locks the relative position of the control ring.

11. The carbonation device according to claim 10, wherein rotation of control ring to the unlocked position aligns the rotation tabs and the flanges with respective spacing between the flanges and the tabs to thereby form unhindered passageways where the control ring can be removed from cap.

12. The carbonation device according to claim 8, further comprising a drain groove formed on the top of the control ring, the drain groove being alignable with the spout to form a continuous tapering drain for disposing residual water in the trough.

13. The carbonation device according to claim 12, wherein rotating the control ring to the locked position aligns the drain groove with the spout, none of the ports, vents, and control grooves being aligned with each other.

14. The carbonation device according to claim 8, wherein rotation of the control ring to the water position aligns the spout and the water chamber port with the first control groove and the first vent with the first vent control groove, the alignment of the spout, first control groove and the water chamber port forming a passage for the water to drain into the water chamber, the first vent and the first vent control groove simultaneously aligning to form a passage for air to escape during filling of the water chamber.

15. The carbonation device according to claim 8, wherein rotation of the control ring to the carbonation position aligns:

the water chamber port and the inlet chamber port with the second control groove, forming a passage for water to drain from the water chamber to the reaction vessel;

the first and second vents with the second vent control groove, forming a passage for carbonating gas to travel to the carbonating gas distribution system; and the third and fourth vents with the third vent control groove, forming a passage for carbonating gas to travel from the reaction vessel to the water chamber.

16. The carbonation device according to claim 8, further comprising a plurality of angularly spaced indicia disposed on top of the control ring, each indicia corresponding to each of the preselected operating positions of the control ring, the spout serving as a pointer alignable with the selected indicia.

17. The carbonation device according to claim 2, wherein the carbonating gas distribution system comprises:

an outlet port disposed at the bottom of the cap; and an elongate tube operatively connected to the outlet port.

* * * * *